Jan. 23, 1962    T. J. McMAHON ETAL    3,017,919
IMPROVED TIRE BUILDING MACHINE
Filed June 17, 1959    2 Sheets-Sheet 2
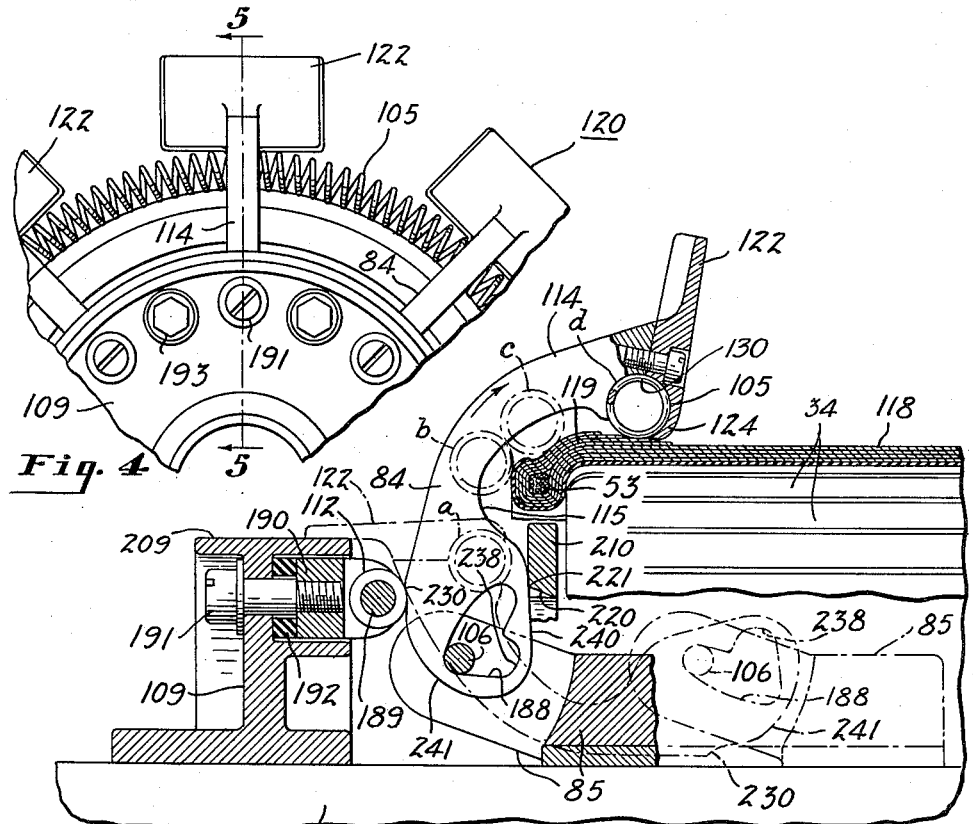
Fig. 4
Fig. 5
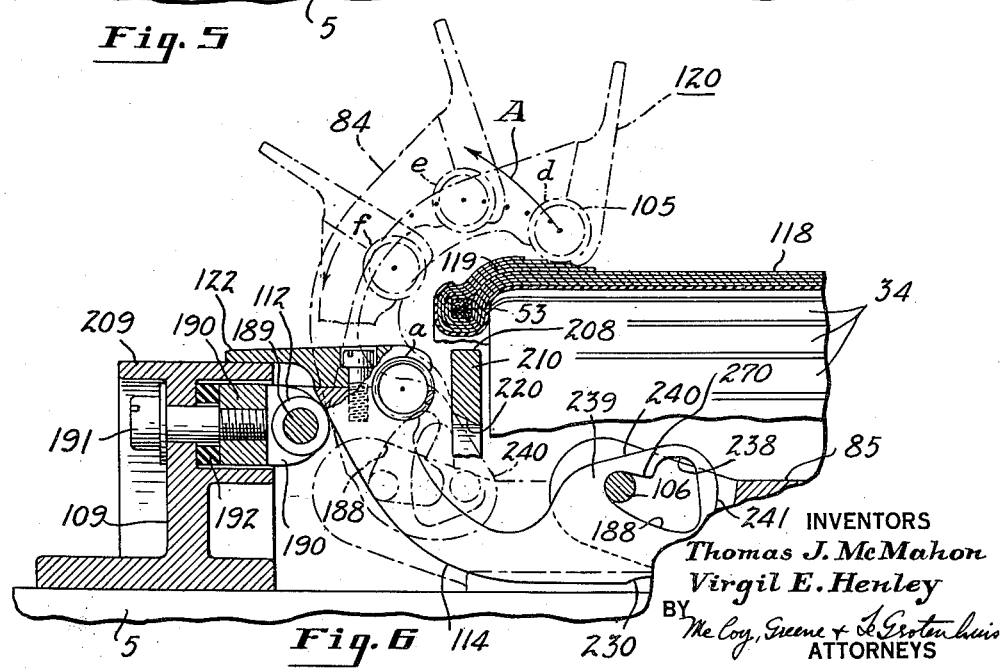
Fig. 6
INVENTORS
Thomas J. McMahon
Virgil E. Henley
BY
McCoy, Greene + deGrotenhuis
ATTORNEYS

United States Patent Office 3,017,919
Patented Jan. 23, 1962

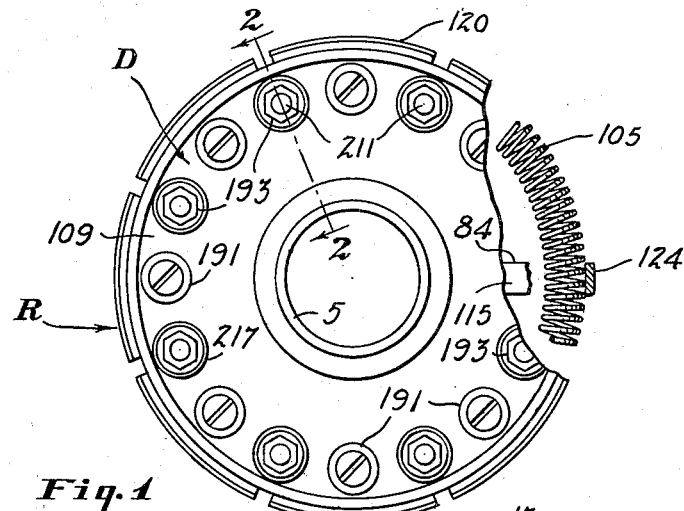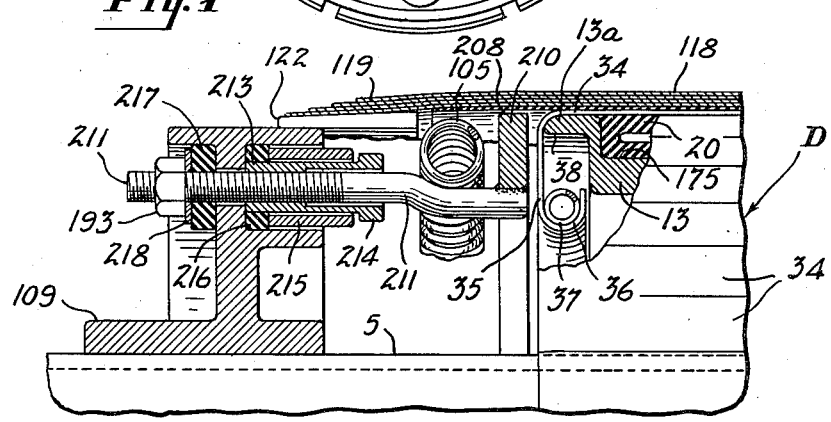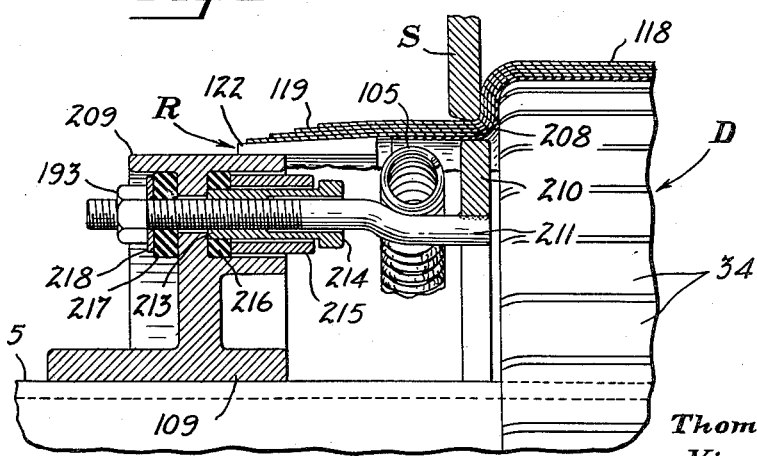

3,017,919
IMPROVED TIRE BUILDING MACHINE
Thomas J. McMahon and Virgil E. Henley, Akron, Ohio, assignors to The General Tire & Rubber Company, Akron, Ohio, a corporation of Ohio
Filed June 17, 1959, Ser. No. 820,954
16 Claims. (Cl. 156—400)

The present invention relates to improved tire building machines and more particularly to a tire building machine having improved means for turning the fabric over the ends of the tire building drum and for adhering the tread to the carcass of the tire on the drum.

In United States Patent No. 2,838,091 and United States Patent No. 2,838,092, both granted June 10, 1958, tire building machines are disclosed having a series of circumferentially spaced curved turnover fingers 114 and 114a that support a resilient constraining annulus or stitching ring in the form of a garter spring 105 or 105a. These fingers are each provided at their inner end with an elongated slot 188 having an offset portion or notch 238 for receiving the control pin 106 or 106a during retraction of the fingers. The offset portion of the slot greatly assists in expanding the garter spring radially outwardly and out of contact with the fabric as the turn-over fingers are retracted after completion of the stitching operation.

Heretofore, there have been instances where the garter spring dragged on the fabric as the turn-over fingers were retracted because of the tendency of gravity acting on some of the turnover fingers to delay proper entry of the control pin into the notch or offset portion of the slot in the inner ends of said fingers. This would occur only with one or two fingers at each end of the drum, but much better results were obtained when the pin was held in the offset portion of the slot in the proper manner. In order to avoid this difficulty, means were provided, as disclosed in copending U.S. application Serial No. 748,-927, filed July 16, 1958, for preventing forward movement of the pin in the elongated slot away from the notch. Such construction was suitable for larger machines but was not satisfactory for small machines wherein, because of space limitations, the turnover fingers had very little metal surrounding the elongated slot.

The present invention relates to apparatus suitable for both large and small tire building machines which insures the proper relationship between the pin and the notch in every turnover finger regardless of which way the gravitational force is acting on the finger so that the garter spring will be properly expanded during retraction and will not drag on the fabric as it moves back off at the end of the tire building drum.

The invention also improves the normal swinging movement of the fingers and provides better support for the fabric for stitching prior to the application of the bead rings.

We have discovered that the operation of a tire building machine of the type described in the aforesaid U.S. patents is greatly improved by providing a fabric-engaging bridge ring adjacent the shoulders of the tire building drum having fulcrum portions for engaging the turn-over fingers when they are in their advanced positions against the drum and for clamping the fingers in position as the control pivot pins, extending through the slots in the radially inner end portions of the fingers, move axially inwardly into the notches of said slots. Thickening of said inner end portions and designing the slots to permit engagement of the axially inner cam surfaces of the turn-over fingers with the fulcrum member before said end portions have moved a substantial distance axially inwardly improves the normal path of movement of the garter spring or stitching ring and reduces dragging of said ring on the fabric as it is expanded out of contact with the fabric upon being retracted.

Such dragging is still further reduced by providing, in addition to the clamping means, means for resisting radial inward movement of the axially outer cam surface of each turn-over finger past its associated cam member as retraction of the fingers is initiated and for causing the finger initially to pivot about an axis located substantially at said cam member as the stitching ring is expanded out of contact with the fabric. Such resistance may be augmented or obtained by providing a recess or projection or otherwise forming a shoulder on the axially outer cam surface of each turn-over finger and by yieldably supporting the cam roller and/or the bridge ring to provide a high axial clamping force.

An object of the present invention is to provide a tire building machine wherein the turn-over fingers are swung radially outwardly during retraction in a more positive and reliable manner.

A further object of the invention is to provide improved means for moving an expansible and contractible stitching ring over the shoulders of the drum so that there is a minimum of drag between said ring and the fabric as the ring is expanded radially away from the fabric.

A still further object of the invention is to provide a simple inexpensive tire building machine which will build tires having carcasses of higher quality in the region of the bead rings.

Other objects, uses and advantages of the present invention will become apparent to those skilled in the art from the following description and claims and from the drawings in which:

FIGURE 1 is an end elevational view on a reduced scale with parts omitted and parts broken away showing a tire building machine constructed according to the present invention.

FIGURE 2 is a fragmentary radial sectional view with parts broken away taken substantially on the line 2—2 of FIG. 1 and on a larger scale, the parts being shown in their positions when the tire building drum is contracted.

FIGURE 3 is a fragmentary radial sectional view similar to FIG. 2 and on the same scale showing the position of the parts after the tire building drum is expanded and during stitching of the fabric at the shoulder of the drum.

FIGURE 4 is a fragmentary end elevational view similar to FIG. 1 and on the same scale showing the position of the parts after the turnover fingers have been moved over the shoulders of the drum to position the fabric around the bead ring.

FIGURE 5 is a fragmentary vertical sectional view taken substantially on the line 5—5 of FIG. 4 with parts omitted and on the same scale as FIG. 2, the turnover finger being shown in solid lines in its fabric-engaging position and being shown in dot-dash lines in its retracted position; and FIGURE 6 is a radial sectional view taken substantially on the line 6—6 of FIG. 1 and on the same scale as FIGS. 2 and 5, the turnover finger being shown in solid lines in its retracted position and in dot-dash lines in its advanced position and in intermediate positions during retraction of the finger.

Referring more particularly to the drawings, which are drawn substantially to scale and in which like parts are identified by the same numerals throughout the several views, FIGURES 1 to 6 show a small semi-automatic tire building machine for making pneumatic rubber tires according to the present invention. This machine is of the type shown in United States Patent No. 2,838,092 and is quite similar to the semi-automatic machines shown in United States Patent No. 2,838,091 and the copending U.S. application of Virgil E. Henley, Serial No. 748,927, filed July 16, 1958. It will be noted that most of the numerals employed herein correspond to the numerals employed in United States Patent No. 2,838,091 and United States Patent No. 2,838,092 to describe parts equivalent to the parts of the device of the present invention. Reference may, therefore, be had to the parts for a more detailed description of the tire building drum, the mechanism for actuating the turnover fingers and other features.

The tire building machine of the present invention includes an expansible and contractable tire building drum D of the type shown in the above-mentioned United States patents which is rigidly mounted on a hollow cylindrical motor driven cantilever shaft 5 for rotation in unison with said shaft about a horizontal axis. The drum D has rigid cylindrical supporting means including axially spaced, generally cylindrical rigid annular members 13 held concentric to the shaft 5 by suitable hub members (not shown), which are keyed to the shaft for rotation in unison therewith. The annular members 13 have recesses 175 in which are mounted inflatable annular pneumatic bags in the form of substantially cylindrical elastic rubber tubes 20 of substantially uniform axial width. Means are provided for inflating the bags 20 during rotation of the drum D as described in said patents.

The drum D is provided with durable expansible metal shell means of cylindrical form to cover the pneumatic annuli 20 and to provide a fabric supporting surface which extends throughout the entire length of the drum. As herein shown, such shell means comprises a multiplicity of narrow sheet metal strips 34 of substantially uniform width extending axially across and deposed around the pneumatic annuli 20. Such shell means is described in detail in United States Patent No. 2,838,091. Each of the strips 34 has substantially segmental end portions 35 at its opposite ends that project radially inwardly beyond the rigid members 13 and substantially engage the opposite ends of said members. The radially inner ends of the segmental portions 35 are bent axially inwardly to form arcuate flanges 36 which support expansible and contractable annular helical garter springs 37 at opposite ends of the drum D. The garter springs 37 bias the strips 34 radially inwardly to hold them against the air bags 20 and to collapse said bags when the air pressure therein is reduced by exhausting the air. The garter spring also engage the inner cylindrical surfaces 38 of the cylinders 13 when the air bags are expanded to limit the radial outward movement of the strips 34 and to position them concentric to the cylinders 13 and the shaft 5.

Means are provided for turning or lapping the end portions 119 of the fabric over the bead rings 53 after said rings have been positioned on the fabric. Such means includes a series of regularly circumferentially spaced curved radial turnover fingers or arms 84 at the opposite ends of the drum D which are moved over the shoulders of the drum by an actuating means including a pair of annular actuating members 85 mounted for axial sliding movements on the cantilever shaft 5. Said actuating members may be moved axially on the shaft 5 by a motor spaced from the drum and suitable rack and pinion means within the shaft as disclosed, for example, in the aforesaid United States patents.

As herein shown, eight regularly circumferentially spaced turnover fingers 84 are provided. Each of the turnover fingers is in the form of a generally arcuately curved lever and is provided with a socket 130 at its outer end of a size to receive a helical annular metal garter spring or stitching ring 105 which may be expanded over the drum D. Each finger or lever 84 has an enlarged inner end portion 239 having external cam surfaces 240 and 241 and having an elongated slot 188. Said slot receives a cylindrical pivot pin 106, which is rigidly mounted on the actuating member 85. Each slot 188 is elongated axially, a major portion thereof extending axially relative to that shaft 5 when the turnover fingers are retracted as shown in solid lines in FIG. 6. Near its axially inner end the slot is provided with an enlargement or notch 238, which extends radially outwardly as shown in solid lines in FIG. 6. The slot 188 and the enlarged portion 238 thereof have a width slightly greater than the diameter of the pin 106 and are shaped so that the pin may move from one end of its associated slot 188 to the other and to the end of the portion 238. The slot 188 is drawn to scale in FIGS. 5 and 6 so that this will be apparent. The shoulder 270 formed by the notch 238 and the end of the slot 188 resists movement of the pin 106 out of the notch 238 during retraction of the turnover fingers as will be apparent from the dot-dash lines in FIG. 6.

It will be noted that the pins 106 and the notches 238 of the slots 188 described in the aforesaid United States patents cooperate in generally the same manner as in the machine described herein. However, it will be noted that gravity acts differently on different turnover fingers 84, at any particular instant because of the different positions thereof relative to the horizontal. Heretofore, difficulty was had in the machines of the type described in said patents because of the action of gravity on one or two of the turnover fingers at each end of the drum which tended to cause improper location of the cam pin 106 in the slot 188. This difficulty was solved to a great extent by the provision of a spring-pressed pin or plunger extending into the slot as described in detail in the aforesaid United States application Serial No. 748,927, but this solution while practical for large tire building machines requiring twelve turnover fingers, as shown in said application, was not satisfactory for small tire building machines wherein the turnover fingers were relatively small. The present invention provides a solution to the problem for the small tire building machines which may employ only six to eight turnover fingers.

The turnover fingers 84 at each end of the tire building drum D are swung radially to expand the two helical garter springs 105 over the opposite end shoulders of the drum in response to axial movement of the actuating members 85. Said garter springs serve as stitching rings to lap the staggered fabric end portions 119 over the bead rings 83 and to adhere said end portions to the underlying multiple ply fabric 118. Means are provided to swing the turnover fingers 84 radially in unison including a pair of large annular metal stop members 109 which are rigidly connected to the cantilever shaft 5 beyond the opposite ends of the drum D and held against axial movement. The stop members 109 have an external diameter which is preferably slightly less than that of the annular members 13 and are located so that they do not interfere with the application of the bead rings or the swinging movement of the turnover fingers.

Cam or fulcrum members 112 and 210 are mounted on the stop in predetermined substantially fixed positions at opposite ends of the drum D to provide pivots or fulcrums for the turnover fingers 84. Said members are preferably mounted on a separate member 109 rather than on the drum D. Each fulcrum member 112 is in the form of an external cylindrical cam roller mounted for rotation on a cylindrical pin 189 parallel to the pin 106 associated with the turnover fingers which engage said roller. The pins 189 are rigidly mounted on brackets 190 which are connected to the stop members 109 by attaching screws or bolts 191. A rubber annulus 192 is mounted between the bracket 190 and the stop member 109 so as to permit a slight movement of the cam roller 112 in a direction parallel to the shaft 5 when force is applied to the roller. The rubber annulus 192 provides means for biasing the roller axially toward the tire building drum D. The cam rollers 112 are regularly spaced about the circumference of each stop member 109 and are located the same radial distance from the axes of the shaft 5 so as to move the turnover fingers 84 in unison while holding the stitching rings 105 perpendicular to the drum axes and concentric to the drum.

Each fulcrum member 210 is in the form of an endless circular bridge ring of generally rectangular cross section and is supported concentric to the shaft 5 and perpendicular to the drum axis by regularly spaced longitudinal supporting bars or rods 211. The rods 211 are welded at their inner ends to the fulcrum rings 210 and are adjustably connected to the stop members 109 by hexagonal nuts 193 which are screwed on the threaded portions of the rods 211. An annular metal sleeve 213 is also screwed on said threaded portion of each rod 210 on the opposite side of the stop member 109 as indicated in FIGURES 2 and 3. The sleeve has a head 214 which is thickened to facilitate adjustment and has a flat surface at the end remote from the head for engaging the member 109. A rubber annulus 216 surrounds the sleeve 213 and is held in position against the member 109 by a metal annulus 215 that extends axially from the head 214 to the rubber annulus 216. A second rubber annulus 217 is mounted on the rod 210 on the opposite side of the member 109 and is held against the vertical surface of the member 109 by the nut 193 and the flat washer 218 as indicated in FIGS. 2 and 3. The rubber annulus 216 fills the space between the end of the sleeve 213 and the internal cylindrical surface of the bore of the member 109 that receives the parts 213, 215 and 216. The annulus 216, therefore, serves to resist radial movements of the rod 211. The annulus 217 cushions axial movements of said rod. It will be noted that clearances are provided between the rod 211 and the member 109 and between the annulus 215 and the member 109 so as to permit slight radial or circumferential movements when high forces are applied to the bridge ring 210.

The rings 210 are located axially inwardly of the outer portions of the fingers 84 between the fingers and the ends of the drum D. The internal radius of each ring 210 is preferably greater than the distance from each cam roller 112 to the axes of the drum shaft 5 so that said ring provides a pivot for its associated turnover finger radially outwardly of the pivot provided for that finger by the cam roller. The fingers 84 are identical and are provided with smoothly curved outer and inner cam surfaces 114 and 115 for engaging the fulcrum members 112 and 210. The outer and inner cam surfaces 241 and 240 of the arms also engage said fulcrum members when the arms are in their advanced positions as indicated, for example, in FIGS. 4 and 5.

Each of the fingers 84 has a segmental fabric engaging portion in the form of an arcuately curved supporting shoe or plate 120 extending transversely of the finger and extending axially in a direction away from the stitching ring as shown in solid lines in FIG. 6. Each shoe 120 has a segmental portion 122 of generally rectangular shape and an axially projecting nose portion 124 midway between the ends of the portion 122. Portions of the shoe including the portion 124 provide the cylindrically curved socket 130 which has substantially the same radius as the garter spring 105. The socket 130 of each turnover finger extends more than half way around the garter spring 105 as shown in FIG. 5 to hold the spring against axial movement. The shoes 120 are described in greater detail in the aforesaid United States Patent No. 2,838,092.

It will be noted that, when the turnover fingers 84 are in their radially innermost (retracted) positions with the portions 122 resting on the cylindrical outer surface 209 of the stop members, the portions 122 are arranged end to end to form a segmental fabric-supporting ring R having a generally cylindrical fabric-engaging surface of uniform axial width, said surface having a diameter substantially equal to or not substantially different from, the external diameter of the rings 210 and substantially equal to or slightly less than the external diameter of the drum D when the drum is contracted as shown in FIG. 2 which is drawn substantially to scale. Said fabric engaging surface may be tapered slightly as indicated in the drawings. It will be noted that the fabric layers applied to the tire building drum extend axially outwardly over the rings 210 and the rings R. The external cylindrical fabric-engaging surface 208 of each bridge ring 210 is axially aligned with the external fabric-engaging surfaces of the ring R and the drum D and serves to support the fabric and to prevent it from sagging radially between the turnover fingers and the drum as indicated in FIG. 2. The relative position of the shoes 120 and the rings 210 are best shown in FIG. 6. Each ring 210 is a small fraction of an inch from the end of the tire building drum and each stitching ring 105 is a small fraction of an inch from the ring 210.

The tire building machine is preferably constructed generally as shown in the drawings with each arm 84 supported so that its medial plane contains the axis of the tire building drum D and with the parts constructed so that said plane intersects and is perpendicular to the cam edge 221 and the axes of the associated pin 106 and roller 112. As shown in the drawings, the non-circular surfaces of the slots 188 and the cam surfaces 114, 115, 240 and 241 associated with each finger 84 are cylindrical surfaces generated by moving a straight line perpendicular to the medial plane of that finger.

The bridge ring 210 at each end of the drum D is spaced from the tire building drum a distance less than the radial thickness of the multiple ply fabric 118 and permits movement of a conventional stitching wheel S axially outwardly from the center of the drum and over the shoulders of the drum to the position shown in FIG. 3 so as to adhere the fabric layers tightly together to remove wrinkles and to remove all air between plies. Movement of such ring over the shoulders of the drum was not feasible with machines of the type shown in the aforesaid United States patents because there was no support for the fabric axially outwardly of the drum. The rings 210 provide such support and cooperate with the stitching wheels S so as to permit manufacture of tires of higher quality. The pressing of the fabric layers against the end of the drum and against the ring 210 prior to application of the bead rings 53 greatly improve the quality of the bead portion of the tire. This stitching operation also makes it somewhat easier to move the bead rings 53 axially over the end portions 119 against the fabric at the end of the drum.

The method of building a tire on the drum D shown herein is substantially the same as disclosed in the aforesaid United States patents. The drum is rotated first in one direction and then the other as strips of bias-cut tire cord fabric are applied to the drum to form an annular rubber-impregnated multiple-ply fabric layer 118 having end portions 119 that extend beyond the ends of the drum. The end edges of the fabric plies are staggered so that the end portions 119 are stepped as indicated in FIG. 2. After the cylindrical layer 118 is applied to the drum, the drum is expanded as shown in FIG. 3 and the inextensible rubber-coated bead rings are pressed by suitable bead placing members, such as the members 50 and 51 of the aforesaid patents, against the fabric on the shoulders of the drum. The bead placing members are then withdrawn and the actuating members 85 are moved axially outwardly from their retracted positions as shown in solid lines in FIG. 6, causing the pin 106 to move against the margin of the slot 188.

As the pins 106 continue their axial outward movement, the outer surfaces 114 of the turnover fingers move radially outwardly to rotate the cam rollers 112 whereby the fingers are swung radially to move the annular garter spring 105 radially outwardly and axially inwardly over the bead ring 53 along a first predetermined path. While moving in this first path, the stitching ring 105 moves from the retracted position *a* through the positions *b* and *c* to the advanced position *d* as shown in FIG. 5. As the fingers swing over the drum shoulders the garter springs 105 contract to press the end portions 119 against the underlying fabric 118 on the drum. The slots 188 of the present invention are shaped so that the pin 106 is adjacent the lower portion of the slot 188 when the finger is in its advanced position as shown in FIG. 5 and function more efficiently than the slots of machines shown in the aforesaid United States patents.

After the turnover fingers reach their advance positions against the fabric on the drum as shown in FIG. 5 the shoulder 230 in the surface 114 at the junction of the surface 114 and the surface 241 (which shoulder projects slightly) is located above the axis of the cam roller 112 so as to resist radially inward movement of the turnover finger. The finger is, therefore, clamped between the cam roller 112 and the cam ring 210 so that gravity cannot move the finger when the pressure between the pin 106 and the portion 239 of the finger is reduced. In this respect the operation is quite different from anything shown in the above-mentioned United States patents.

Each finger 84 in its advance position is clamped against the straight pivot edge 221 which is formed by cutting a slot 220 in the ring 210. A series of regularly circumferentially spaced slots 220 are provided in each ring 210 to receive the enlarged portions 239 of the fingers when the fingers are in their advanced positions. These slots may have a shape as indicated in FIGS. 5 and 6 which are drawn to scale. The cam edge 221 associated with each turnover finger is located a small fraction of an inch radially outwardly of the axis of the associated cam roller 112 and parallel to said axis and to the axis of the pin 106 for that finger. The edge 221 engages the cam surface 240 when the associated finger 84 is in its advance position shown in FIGS. 4 and 5 and the slots 220 eliminate interference between the rings 210 and the finger as the finger is retracted.

After the end portions 119 have been turned over the bead rings, the actuating members 85 are moved axially inwardly to retract the fingers. The clamping of each finger between the ring 210 and a roller 112 holds the finger in position as the pin 106 moves from the position shown in FIG. 5 into the notch 238 so as to avoid the difficulties had previously with tire building machines as disclosed, for example, in the aforesaid United States patents. After the pin 106 engages the bottom of the notch 238, a force is applied to the bottom portion of the finger sufficient to force the projection 230 past the roller 112 and to compress the rubber annuli 192 and 217. This force causes the arm to pivot initially about the projection 230 and expands the stitching ring 105 radially outwardly out of contact with the fabric on the drum. The stitching ring 105 is caused to move from the advanced position $d$ through the positions $e$ and $f$ to the retracted position $a$ along a second path radially outwardly of the first path (indicated by positions $b$ and $c$ in FIG. 5).

Since the bridge ring 210 is in contact with each turnover finger 84 at that end of the drum when the finger is in its advanced position as shown in FIG. 5, it is unnecessary for the lower end of the finger to move axially inwardly before obtaining the pivoting action necessary to expand the stitching ring 105 as was the case in machines of this type prior to the present invention. Stitching ring 105 is, therefore, expanded radially outwardly with less drag on the fabric and the path of movement of the stitching ring is radially outwardly of the path which would be obtained if the fulcrum 221 were spaced axially from the advanced finger 84. It will be noted that the lower end portion 239 of each finger 84 is enlarged with respect to the fingers shown in the aforesaid United States patents so that the finger can be clamped in the desired manner between a cam roller 112 and the ring 210 and so that the desired pivoting action can be obtained. The clamping of the fingers, therefore, has the advantage not only of holding the fingers in position against the action of gravity but also of providing a more desirable path of retracting movement of the stitching ring 105. This is true even where the projection 230 is omitted or is too small to have any effect. As a result, the machine of the present invention produces tires which are of substantially higher quality than the tires produced on machines of the type shown in the aforesaid patents. The improved swinging action of the fingers also enables the machine of this invention to function better than a machine of the type shown in the above-mentioned United States application Serial No. 748,927.

The rubber members 192, 216 and 217 and the associated rigid members supporting the cam rollers 112 and the bridge ring 210 preferably provide yieldable means for exerting a high clamping force on the enlarged portion 239 of each turn-over finger sufficient to cause radial outward sliding of said portion over the cam edge 221 and to cause the finger to pivot substantially about the point of engagement of the projection 230 with the cam roller 112 in the direction indicated by the arrow A of FIG. 6 at the instant retraction of the finger is initiated and during the initial movement of the stitching ring 105 in the aforesaid second path from the advanced position $a$ toward the position $e$.

The enlarged portion or notch 238 of each slot 188 is wider than the pin 106 to provide a clearance and to permit a substantial amount of said radial outward sliding whereby the shoulder 270 of each finger can move radially a small fraction of an inch away from its associated pin 106 as the shoulder 230 of that finger is forced radially inwardly past its associated cam roller 112. Such clearance is indicated by the dot-dash lines in FIG. 6.

As the shoulder 230 moves over the roller 112 to reduce the clamping pressure exerted by the elastic rubber members 192 and 217, the shoulder 270 moves back against the pin 106 to limit the radial inward movement and the finger pivots substantially about the edge 221. Several points in the aforesaid second path between points $d$ and $e$ are shown in FIG. 6 to make it apparent that the stitching ring 105 will not drag on the fabric as it is retracted.

As herein shown, the cam surface 114 is a short distance outwardly of the cam surface 241 so that the cam shoulder 230 joining these cam surfaces serves as means to resist inward movement of the surface over the roller 112, it being unnecessary to provide a roller-receiving groove or a projection between said cam surfaces to form the needed shoulder. The height of the shoulder and the clamping force exerted by the yieldable means 192 and 217 may, of course, be varied while still obtaining the unusual pivoting action about the shoulder 230.

It will be understood, however, that the thickening of the portions 239 and the location of the fulcrums 221 closer to the fingers at the instant of retraction greatly improves the normal path of movement of every stitching ring 105 even where the fingers are not caused to pivot initially at the roller 112 during retraction and even where the clamping force needed to hold each finger against movement by gravity is omitted. The bridge ring 210 of the present invention improves a tire building machine in several different ways as will be apparent from the above description without materially adding to the cost of the machine and such ring can easily be added to existing machines of the type shown in the aforesaid U.S. patents.

The cam shoulder 230 of each finger is preferably so shaped and located that the rubber members 192 and 217 are compressed and a high axial clamping force is exerted by said members against said shoulder when the turn-over fingers 84 are in their advanced positions as shown in solid lines in FIG. 5 and the stitching ring is contracted against the fabric, whereby the time required to build up the clamping force needed to cause pivoting about said shoulder after initiation of the retracting movement is negligible and such pivoting is obtained immediately.

The pin-and-slot connection between the actuating member 85 and each finger 84 may comprise a pin carried by the finger and a slot in the actuating member to receive the pin, but the reverse is preferred so that the lifting effect of a notch 238 can be obtained.

It will be understood that the above description is by way of illustration rather than limitation and that, in accordance with the provisions of the patent laws, variations and modifications of the specific devices disclosed herein may be made without departing from the spirit of the invention.

Having described our invention, we claim:

1. A tire building machine comprising a tire building drum mounted for rotation about a fixed axis, means for expanding and contracting a stitching ring over the shoulder of the drum comprising a series of circumferentially spaced curved turn-over fingers connected at its radially outer ends to said stitching ring, and an actuating member pivotally connected to the radially inner ends of said fingers and mounted for axial movement, a series of pivot pins carried by said actuating member, said fingers being connected to said stitching ring at their radially outer ends, each finger having a slot at its radially inner end for receiving one of said pivot pins and having curved radially inner and outer cam surfaces, a first cam means for engaging one of said cam surfaces of each finger to swing the stitching ring over the drum shoulders to a predetermined advanced position against the drum in response to axial outward movement of said actuating member away from said drum, and second cam means for engaging the other of said cam surfaces to swing the stitching ring from said advanced position to a predetermined retracted position adjacent said second cam means, and means for holding the radially inner end portion of each finger against the first cam means when the finger is in said advanced position and for resisting movement of said inner end portion past said cam means as retracting movement of the finger is initiated to cause the finger to pivot generally where the finger engages said first cam means as said actuating means is moved axially inwardly toward the drum.

2. A tire building machine comprising a tire building drum mounted for rotation about a fixed axis, means for expanding and contracting a stitching ring over the shoulder of the drum comprising a series of circumferentially spaced curved turn-over fingers, and an actuating member pivotally connected to the radially inner ends of said fingers and mounted for axial movement, a series of pivot pins carried by said actuating member, said fingers being connected to said stitching ring at their radially outer ends, each finger having a slot at its radially inner end for receiving one of said pivot pins and having curved radially inner and outer cam surfaces, one of said cam surfaces having a shoulder therein, first cam means for engaging said one of said cam surfaces of each finger to swing the stitching ring over the drum shoulders to a predetermined advanced position against the drum in response to axial outward movement of said actuating member away from said drum, said shoulder moving past said cam means as the stitching ring arrives at said advanced position, and a bridge ring adjacent the shoulders of said drum having second cam means for engaging the other of said cam surfaces to swing the stitching ring from said advanced position to a predetermined retracted position adjacent said bridge ring coaxial with said bridge ring and said drum and axially outwardly of said bridge ring, and means for holding said first and second cam means against radial movement and for resisting axial movement of said cam means, the last-named holding means holding both of said cam means against each finger when the stitching ring is in said advanced position and resisting movement of said shoulder of each finger past said first cam means as the actuating means is moved axially inwardly toward the drum to initiate movement from said advanced toward said retracted position.

3. In combination, a curved lever having curved cam surfaces on opposite sides thereof and an enlarged end portion, an actuating member, means providing a pin-and-slot connection between said actuating member and said enlarged end portion, a first cam means engaging one of said cam surfaces for causing the lever to swing from a predetermined retracted position to a predetermined advanced position in response to axial movement of the actuating member in one direction, a second cam means engaging the other of said cam surfaces for causing the lever to swing in the other direction from said advanced position to said retracted position in response to axial movement of the actuating member in the other direction, yieldable means for clamping said cam means against the lever when the lever is in said advanced position, and means for resisting movement of said first cam means relative to said one of said cam surfaces and for causing movement of said second cam means relative to said other of said cam surfaces as permitted by said slot to pivot the lever substantially about said first cam means in response to movement of the actuating member in said other direction as the lever initially moves out of said advanced position.

4. In a tire building machine having a shaft, a generally cylindrical expandable drum mounted on said shaft for receiving a plurality of fabric layers with end portions extending axially beyond the shoulders of the drum, means for positioning inextensible bead rings over the fabric end portions adjacent the drum shoulders, fabric lapping means for turning the end portions of the fabric layers radially outwardly and axially inwardly over the bead rings including a series of circumferentially spaced curved turn-over fingers mounted at each end of the drum, each of said fingers having a slot at its radially inner end with an enlarged portion of the slot located at the end of the slot nearest said last-named inner end and a stop shoulder between said enlarged portion and the other end of the slot, stop members mounted near opposite ends of said drum and held against axial movement relative to the drum, actuating members mounted on the shaft for axial movement toward and away from said stop members and having pivot pins thereon that fit in the slots of said fingers, an expansible and contractible stitching ring connected to the radially outer ends of the turn-over fingers near each end of said drum to resist radial outward movement of said outer ends, the fingers being arranged to move each stitching ring from a position below an axially extending end portion of said fabric radially outwardly and axially inwardly over the drum and against the fabric on the drum to lap the fabric over the bead rings as the pivot pins of the actuating members are moved axially outwardly toward said stop members, said stop members having fulcrum means for swinging the fingers over the drum in response to axial movement of the radially inner ends of said fingers by said pivot pins, the enlarged portions of said slots being located to receive said pins when the pins are moved axially inwardly while the fingers are in their normal advanced positions against the fabric on the drum, the improvement which comprises means spaced from the drum for holding the radially inner ends of the turn-over fingers against downward movement toward said shaft during movement of said pins into said enlarged portions just before the fingers are retracted, whereby each of the pins engages the shoulder of its associated slot as retraction of the fingers is initiated by axial inward movement of the actuating members.

5. A tire building machine as defined in claim 4 wherein said last-named means engages the opposite sides of each arm to grip the arm when the radially inner end of that arm is in its radially outermost position.

6. A tire building machine as defined in claim 4 wherein each of said turn-over fingers is enlarged at its radially inner end and said last-named means comprise a fulcrum member mounted in a predetermined position on said stop member on one side of a turn-over finger and means mounted in a predetermined position on said stop member for engaging the other side of that finger, said fulcrum member and said last-named means being located to permit swinging of said finger and to engage the opposite sides of the enlarged portion of the finger when the finger is in its advanced position.

7. In a tire building machine having a generally cylindrical drum mounted for rotation about a horizontal axis, means for supporting an expansible and contractible stitching ring near the shoulder on the drum and for expanding and contracting the ring over the drum including a series of circumferentially spaced curved turn-over fingers and an actuating member radially inwardly of said drum shoulder mounted for axial movement within said drum and pivotally connected to the radially inner ends of said fingers, said fingers being connected to said stitching ring at their radially outer ends, a stop member held against axial movement relative to said drum, cam means mounted on said stop member for engaging the axially outer surfaces of said fingers to swing the stitching ring toward said drum in response to axial movement of the actuating member toward said stop member, and a fulcrum member mounted in a predetermined position and having means for engaging the axially inner surface of the finger radially outwardly of said cam means to swing the stitching ring away from said drum in response to movement of said actuating member away from said stop member, said finger being enlarged at its radially inner end and engaging both said cam means and said fulcrum member when in its advanced position.

8. A tire building machine as defined in claim 5 wherein said cam means is yieldably mounted and clamps the radially inner end of said finger against said fulcrum member to hold the finger in position when the finger is in its advanced position.

9. A tire building machine as defined in claim 8 wherein the finger has a shoulder for engaging the cam means to hold the finger in said advanced position, said cam means moving axially to permit movement of the shoulder radially past said cam means and applying sufficient force to said shoulder to cause the finger to pivot about said shoulder as the shoulder moves radially inwardly past said cam means.

10. A tire building machine as defined in claim 7 wherein said drum has means for moving the outer surface of the drum from a generally cylindrical contracted position to an expanded position and said fulcrum member comprises a rigid immovable bridge ring having a generally cylindrical surface adjacent the end of the drum with an external diameter substantially the same as that of the drum when the drum is in said contracted position, said finger retracting the stitching ring to a predetermined contracted position adjacent to and concentric to said bridge ring wherein the external diameter of the contracted stitching ring is less than the external diameter of said bridge ring.

11. A tire building machine having an expansible drum mounted for rotation about a horizontal axis, an expansible and contractible stitching ring, a series of circumferentially spaced curved turn-over fingers having enlarged radially inner ends with elongated slots therein, an actuating member mounted for reciprocation in the direction of the drum axis and having pivot pins within said slots for pivotally connecting the actuating member to the fingers, said fingers being connected to said stitching ring at their radially outer ends to hold said ring concentric to said drum and having segmental fabric-engaging portions at their outer ends extending transversely of the fingers and arranged end to end circumferentially to form a segmental generally cylindrical ring extending axially outwardly from said stitching ring when said segmental portions are in their radially innermost positions, a bridge ring mounted in a predetermined position between said stitching ring and said drum and having a circumferential fabric-engaging surface adjacent said drum substantially in axial alignment with the fabric-engaging surfaces of the segmental ring and the contracted drum, said bridge ring having fulcrum portions for engaging the axially inner surfaces of said fingers to expand the stitching ring radially out of contact with the drum in response to axial inward movement of said actuating member and for engaging the enlarged radially inner portions of said fingers when the fingers are in their advanced positions and the latter portions are in their radially outermost positions, and cam means for engaging the axially outer surfaces of said fingers to swing the fingers in unison radially outwardly and axially inwardly over the drum shoulders to an advanced position against the drum and against said bridge ring in response to axial outward movement of said actuating member.

12. In combination, a pair of rigid members, a curved lever between said members having curved cam surfaces on opposite sides thereof and having a shoulder in one of said cam surfaces between the ends of the lever, an actuating member mounted for reciprocation, means providing a yielding pivotal connection between said actuating member and one end of said lever, the other end of the lever being free to swing relative to said actuating member from a retracted position against one of said rigid members to an advanced position against the other of said rigid members, a first cam means for engaging the cam surface on one side of said lever to swing the lever from said retracted to said advanced position and for causing said other end of the lever to move along a first predetermined curved path between said positions in response to movement of said actuating member toward said one of said rigid members, said shoulder engaging said cam means as the lever approaches said advanced position, and a second cam means for engaging the cam surface on the opposite side of said lever to swing the lever from said advanced to said retracted position and for causing said other end of the lever to move along a second predetermined path between said positions in response to movement of the actuating member away from said one of said members, and yieldable means for pressing said first and second cam means against said lever when the lever is in said advanced position to resist movement of said shoulder past said first cam means, said shoulder being located against said first cam means when the lever is in said advanced position and extending outwardly to provide means for resisting movement of the lever out of said advanced position, said last-named means and said cam means causing the lever to pivot about said shoulder as the lever is initially swung out of the advanced position toward the retracted position, whereby said second path is farther from the actuating member than said first path when the lever is initially moved out of said advanced position.

13. The combination as defined in claim 1 wherein said means for resisting movement comprises a shoulder on each of said fingers located to engage the first cam means as its associated finger initially moves out of said advanced position.

14. The combination as defined in claim 13 wherein the means for holding the radially inner portion of each finger against the first cam means includes said second cam means and resilient means for supporting one of said cam means and for yieldably resisting axial movement of one cam means away from the other cam means, the last-named holding means holding both of said cam means against each finger when the stitching ring is in said advanced position and resisting movement of said shoulder past said first cam means as the actuating means is moved axially inwardly to initiate movement from said advanced position toward said retracted position.

15. In combination, a lever having an outwardly projecting shoulder located between its ends, a cam roller for moving over and engaging said shoulder as the lever is pivoted, actuating means pivotally connected to one end of said lever, and yieldable means for holding the cam roller against the lever to resist movement of the roller over said shoulder and to cause the lever to pivot about said shoulder.

16. A tire building machine comprising a generally cylindrical expandable tire building drum mounted for rotation about a fixed horizontal axis and located to receive a plurality of fabric layers with end portions extending axially beyond the shoulders of the drum, means for positioning inextensible bead rings over the fabric end portions adjacent the drum shoulders, fabric lapping means for expanding and contracting a stitching ring over each shoulder of the drum comprising a series of circumferentially spaced curved turn-over fingers at each end of the drum having their radially outer ends connected to one of the stitching rings, and an actuating member at each end of said drum pivotally connected to the radially inner ends of the fingers and mounted for axial movement, a series of pivot pins carried by each actuating member, said fingers being connected to said stitching rings at their radially outer ends, each finger having a slot at its radially inner end for receiving one of said pivot pins and having curved radially inner and outer cam surfaces, a first cam means at each end of the drum for engaging one of said cam surfaces of each finger to swing the stitching ring over the drum shoulders to a predetermined advanced position against the drum in response to axial outward movement of said actuating member away from said drum to turn the end portions of the fabric layers radially outwardly and axially inwardly over the bead rings, and means for supporting the fabric when the fingers are retracted and for engaging the other of said cam surfaces to expand the stitching ring out of contact with the fabric and from said advanced position to a predetermined retracted position, said last-named means including fulcrum portions mounted in fixed positions for engaging the other of said cam surfaces of said fingers, a bridge ring permanently mounted in a predetermined position between each retracted stitching ring and said drum and concentric thereto for supporting the fabric end portions when the stitching ring is in its retracted position, and means adjacent to and axially outwardly of the retracted stitching ring, each providing a generally cylindrical fabric-engaging surface, said bridge ring having a circumferential generally cylindrical fabric-engaging surface radially outwardly of the retracted stitching ring and of substantially the same diameter as that of the contracted tire building drum, said bridge ring being spaced axially a small fraction of an inch from the stitching ring and being spaced axially from the end of the drum a distance less than the radial thickness of the multiple ply fabric on the drum to permit pressing of the fabric against said ring.

References Cited in the file of this patent

UNITED STATES PATENTS

| | | |
|---|---|---|
| 1,966,541 | Denmire | July 17, 1934 |
| 2,409,974 | Breth | Oct. 22, 1946 |
| 2,614,952 | Kraft | Oct. 21, 1952 |
| 2,838,091 | Kraft | June 10, 1958 |
| 2,838,092 | McMahon | June 10, 1958 |
| 2,915,916 | Hinsey | Dec. 8, 1959 |